(12) United States Patent
Fredenburg et al.

(10) Patent No.: US 11,535,064 B2
(45) Date of Patent: Dec. 27, 2022

(54) AIRLESS FLEXIBLE TIRE WITH Z-TREAD TRACK PATTERN

(71) Applicant: LINDSAY CORPORATION, Omaha, NE (US)

(72) Inventors: Michael Fredenburg, Hickman, NE (US); Thomas J. Korus, Lindsay, NE (US)

(73) Assignee: LINDSAY CORPORATION, Omaha, NE (US)

( * ) Notice: Subject to any disclaimer, the term of this patent is extended or adjusted under 35 U.S.C. 154(b) by 1443 days.

(21) Appl. No.: 15/813,313

(22) Filed: Nov. 15, 2017

(65) Prior Publication Data

US 2019/0143757 A1 May 16, 2019

(51) Int. Cl.
| | |
|---|---|
| *B60C 7/24* | (2006.01) |
| *B60C 11/11* | (2006.01) |
| *B60C 11/13* | (2006.01) |
| *B60C 11/04* | (2006.01) |
| *B60C 11/03* | (2006.01) |
| *B60C 11/02* | (2006.01) |
| *B60B 15/02* | (2006.01) |

(52) U.S. Cl.
CPC ............. *B60C 11/04* (2013.01); *B60C 7/24* (2013.01); *B60C 11/02* (2013.01); *B60C 11/0311* (2013.01); *B60C 11/0316* (2013.01); *B60C 11/0327* (2013.01); *B60C 11/1307* (2013.01); *B60B 15/026* (2013.01)

(58) Field of Classification Search
CPC ............ B60C 11/0311; B60C 11/0316; B60C 11/1307; B60C 11/0327; B60C 7/24; B60B 15/026
See application file for complete search history.

(56) References Cited

U.S. PATENT DOCUMENTS

| | | | | |
|---|---|---|---|---|
| 3,844,326 | A | * 10/1974 | Verdier | ............... B60C 11/0311 |
| | | | | 152/209.12 |
| 4,262,720 | A | 4/1981 | Hanke | |
| 4,471,825 | A | 9/1984 | Kuhn | |
| D367,448 | S | * 2/1996 | Baus | .......................... D12/579 |
| 7,237,588 | B2 | 7/2007 | Suzuki | |
| 9,108,469 | B2 | 8/2015 | Wallet | |
| D748,568 | S | * 2/2016 | Helin | .......................... D12/570 |
| 2009/0084478 | A1* | 4/2009 | Wallet | ................. B60C 11/0311 |
| | | | | 152/209.13 |
| 2014/0083586 | A1* | 3/2014 | Korus | ....................... B60C 7/24 |
| | | | | 29/894.31 |
| 2015/0202917 | A1* | 7/2015 | Korus | ....................... B60C 7/24 |
| | | | | 152/5 |
| 2015/0283856 | A1* | 10/2015 | Pfrenger | ................... B60C 7/24 |
| | | | | 157/1.1 |

* cited by examiner

*Primary Examiner* — Steven D Maki
(74) *Attorney, Agent, or Firm* — Hovey Williams LLP (57) ABSTRACT

An airless flexible tire including traction lug pairs each having a forward facing traction lug and a rearward facing traction lug cooperatively forming a divided Z or reverse divided Z shape. Each traction lug includes a lateral section and a central section. The central section extends from an end of the lateral section so as to straddle a centerline of the airless flexible tire and includes a number of discrete sidewalls. The discrete sidewalls are different sizes and angled relative to each other. The central sections of paired traction lugs form a space dividing portions of the Z or reverse Z shape. The central sections of nearest traction lugs of adjacent traction lug pairs form a space dividing the adjacent traction lug pairs.

23 Claims, 4 Drawing Sheets

AIRLESS FLEXIBLE TIRE WITH Z-TREAD TRACK PATTERN

BACKGROUND

Movable agricultural irrigation systems such as center-pivot and linear systems are commonly used to irrigate large fields and typically include a conduit extending across several irrigation spans. Each irrigation span supports a conduit section elevated on a support tower including two wheel assemblies configured to traverse a path along the ground for moving the conduit across the fields. After multiple passes of the irrigation system, the path often develops deep ruts in which the wheels of the support tower can become stuck. The path can be repaired by filling the ruts with soil or other material, but this requires a substantial amount of material and is time consuming and difficult to do without damaging crops in the process. Ruts can be minimized by shifting the center pivot point by a few feet so that the wheel assemblies create a new path, but this results in the destruction of additional crops and may cause the wheel assemblies to become stuck or misaligned when crossing over previously worn paths. Also, this requires the installation of additional pipe and electrical center pivot components.

Airless flexible tires having a more flattened transverse shape than conventional tires have been used to reduce ruts and improve traction. However, the more flattened transverse shape results in more evenly distributed ground engaging pressure, which can reduce traction and increase slippage. Many traction lug patterns haphazardly disrupt the soil, further reducing traction and increasing slippage over subsequent passes. The traction lugs also do little to prevent soil erosion since rain and/or irrigation water can flow freely along the path.

SUMMARY

The present invention solves the above-described and other problems and limitations by providing an improved airless flexible tire for a wheel assembly of an irrigation system.

The airless flexible tire may be configured for mounting on a rigid wheel. The rigid wheel includes a central support and a number of mounting components. The central support may be a hub or similar component. The mounting components may be mounting bosses or other radially extending protrusions, fasteners, fastener openings, or separate components radially attached to the central support via fasteners or interlocking geometry.

The airless flexible tire includes an inner surface, an outer surface, opposing sidewalls, drive lugs, and pairs of traction lugs. The inner surface and outer surface are substantially transversely flat such that the airless flexible tire exerts substantially downward ground engaging pressure and little to no lateral ground engaging pressure. The opposing sidewalls extend between side edges of the inner surface and outer surface.

The drive lugs are spaced from each other on the inner surface for aligning with and engaging the mounting components of the rigid wheel. The drive lugs may be separate mounting elements or may be integrally formed on the airless flexible tire and may include complementary geometry for securing the airless flexible tire on the rigid wheel.

The traction lug pairs create a non-directional lug pattern and each include a forward facing traction lug and a rearward facing traction lug forming a divided Z or reverse divided Z shape. The traction lug pairs are identical in every aspect except for their placement on the outer surface of the airless flexible tire. Thus, only one traction lug pair is described below.

An exemplary forward facing traction lug includes a lateral section and a central section. The lateral section extends from one of the sidewalls of the airless flexible tire towards a centerline of the airless flexible tire and includes an upper surface and opposing sidewalls. The upper surface is slanted from an upper surface of the central section to the sidewall of the airless flexible tire. The sidewalls of the lateral section are angled such that the lateral section tapers from the central section to the sidewall of the airless flexible tire. This allows the traction lug to exert more pressure on the ground near the centerline of the airless flexible tire and less pressure on the ground near the tire's sidewalls.

The central section straddles the centerline of the airless flexible tire and includes an upper surface and a number of discrete sidewalls. The upper surface is substantially flat or slightly convex and protrudes radially farther than the lateral section from the central axis of the airless flexible tire. The discrete sidewalls are different sizes and angled relative to each other such that the central section has an irregular polygon shape. The discrete sidewalls are drafted for improving soil shedding.

The rearward facing traction lug includes a lateral section and a central section identical to the lateral section and central section described above except that the lateral section of the rearward facing traction lug extends from an opposite sidewall of the airless flexible tire and the central section of the rearward facing traction lug faces in the opposite direction of the central section of the forward facing traction lug. Thus, the rearward facing traction lug will not be described further.

The forward facing traction lug and rearward facing traction lug are paired so as to form a divided Z or reverse divided Z shape. To that end, the central sections of the paired traction lugs extend towards each other. One of the discrete sidewalls of each traction lug is a primary sidewall extending parallel to a primary sidewall of the other traction lug in the pair so as to form a space of uniform width dividing portions of the Z or reverse Z shape.

The traction lug pair is spaced from other traction lug pairs so as to form a pattern of divided Z or reverse divided Z shapes. To that end, one of the discrete sidewalls of each traction lug is a secondary sidewall extending parallel to a secondary sidewall of the nearest traction lug of an adjacent traction lug pair so as to form a space of uniform width dividing the adjacent traction lug pairs from each other.

In use, the airless flexible tire engages a layer of compliant soil as the rigid wheel traverses a path along the ground surface with the traction lug pairs of the airless flexible tire gripping soil along the path. The taller central sections create higher pressure in the middle of the path, thus forming a high pressure center zone.

The primary sidewalls of traction lug pairs urge soil into the space therebetween so as to form a ridge in the soil in the high pressure center zone. The ridge traps water running down the path, which decreases soil erosion. The secondary sidewalls of adjacent traction lug pairs counteract lateral forces on the irrigation system and prevent slippage. The discrete sidewalls, having distinct angles therebetween, direct soil in specific directions, which improves ridge formation and soil shedding and minimizes outward soil disruption.

The above-described airless flexible tire provides several advantages over conventional tires. For example, the divided Z shape or reverse divided Z shape of the traction lug pairs and the distinct angles between the discrete sidewalls improve ridge formation and soil shedding. The primary sidewalls further improve ridge formation, which increases traction and decreases soil erosion. The secondary sidewalls counteract lateral forces and prevent slippage, which decreases the chances of the wheel assembly becoming stuck in the path.

The taller central sections of the traction lugs increase central pressure in the path while the smaller and/or tapered lateral sections help to minimize outward soil disruption. This decreases rut formation and further decreases the chances of the wheel assembly becoming stuck in the path. The larger areas of the upper surface of the central sections add rigidity to the central portion of the airless flexible tire. The smaller and/or tapered lateral sections help to minimize outward soil disruption. The drafted sidewalls shed soil and improve mold release during production. The traction lugs may also have a torque reduction profile, which can be used when less driving torque is desired.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
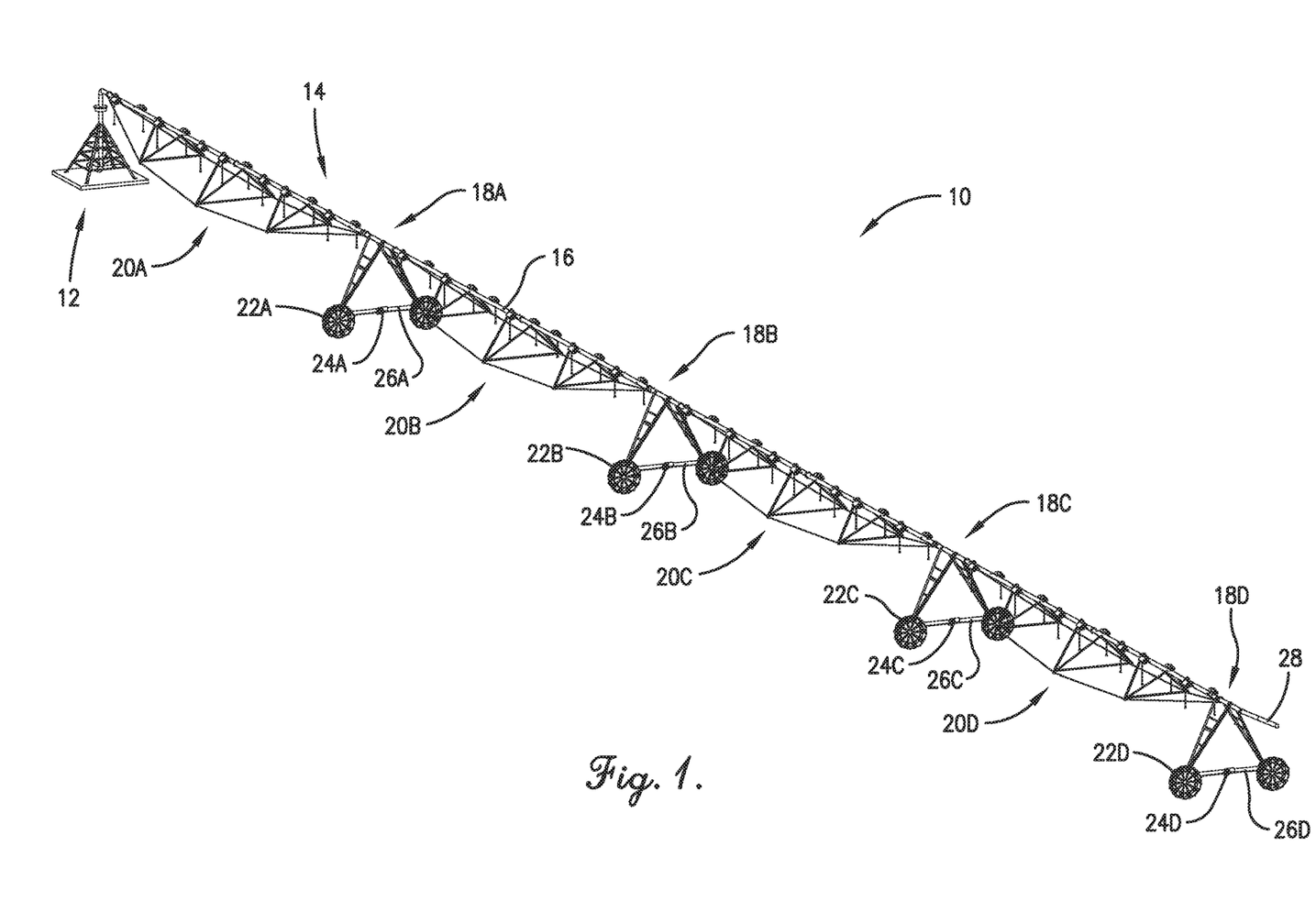
FIG. 1 is a perspective view of an irrigation system on which wheel assemblies including airless flexible tires constructed in accordance with an embodiment of the invention may be mounted.

Turning now to the drawing figures, and initially FIG. 1, an exemplary irrigation system 10 on which the airless flexible tire of the present invention may be mounted is illustrated. The irrigation system 10 is a central pivot irrigation system broadly comprising a fixed central pivot 12 and a main section 14 pivotally connected to the central pivot 12. The irrigation system 10 may also comprise an extension arm (also commonly referred to as a "swing arm" or "corner arm") pivotally connected to the free end of the main section 14.

The fixed central pivot 12 may be a tower or any other support structure about which the main section 14 may pivot. The central pivot 12 draws from a well, water tank, or other source of water and may also be coupled with a tank or other source of agricultural products to inject fertilizers, pesticides and/or other chemicals into the water for application during irrigation. The central pivot 12 may supply water to a conduit 16 which carries the water along the length of the main section 14.

The main section 14 may comprise a number of mobile support towers 18A-D, the outermost 18D of which is referred to herein as an "end tower". The support towers 18A-D are connected to the fixed central pivot 12 and to one another by truss sections 20A-D or other supports to form a number of interconnected spans. The irrigation system 10 illustrated in FIG. 1 includes four mobile support towers 18A-D; however, it may comprise any number of mobile support towers without departing from the scope of the present invention.

Each mobile tower may include a pair of wheel assemblies 22A-D and one or more drive motors 24A-D mounted on a drive tube 26A-D. Embodiments of the wheel assemblies 22A-D are described in more detail below. The drive motors 24A-D may include integral or external relays so they may be turned on, off, and reversed. The drive motors 22A-D may have several speeds or may be equipped with variable speed drives and may be turned on, off, and reversed.

Each truss section 20A-D carries or otherwise supports conduit 16 or other fluid distribution mechanism. A plurality of sprinkler heads, spray guns, drop nozzles, or other fluid-emitting devices are spaced along the conduit 16 to apply water and/or other fluids to land underneath the irrigation system.

The irrigation system 10 may also include an optional extension arm pivotally connected to the end tower 18D and supported by a swing tower with steerable wheels driven by a drive motor. The extension arm may be joined to the end tower by an articulating pivot joint. The extension arm is folded inward relative to the end tower when it is not irrigating a corner of a field and may be pivoted outwardly away from the end tower while irrigating the corners of a field.

The irrigation system 10 may also include one or more high pressure sprayers or end guns 28 mounted to the end tower 18D or to the end of the extension arm. The end guns 28 may be activated at the corners of a field or other designated areas to increase the amount of land that can be irrigated.

It will be appreciated that the irrigation system 10 is illustrated and described herein as one exemplary implementation of the wheel assemblies 22A-D described in detail below. Other, equally preferred implementations of the wheel assemblies 22A-D not shown or discussed in detail herein may include, without limitation, other types of irrigation systems, such as lateral irrigation systems, other types of agricultural equipment, such as wagons, carts, implements, and so forth, or other types of vehicles such as buses, trucks, and automobiles. However, embodiments of the invention are especially suited for irrigation systems and other vehicles or systems that travel over un-paved or un-finished ground.

Figure 2:
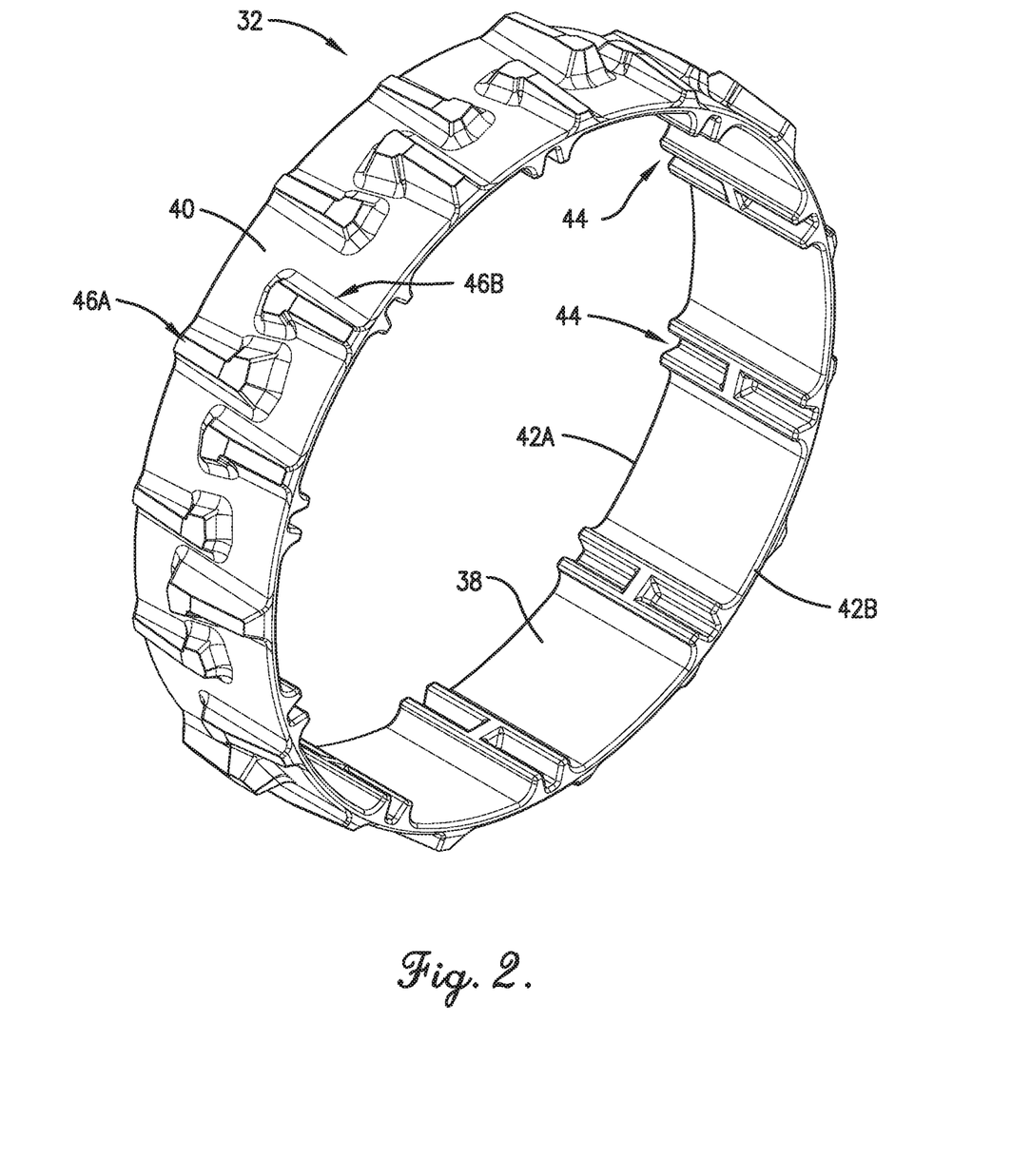
FIG. 2 is a perspective view of an airless flexible tire constructed in accordance with an embodiment of the invention.
Figure 3:
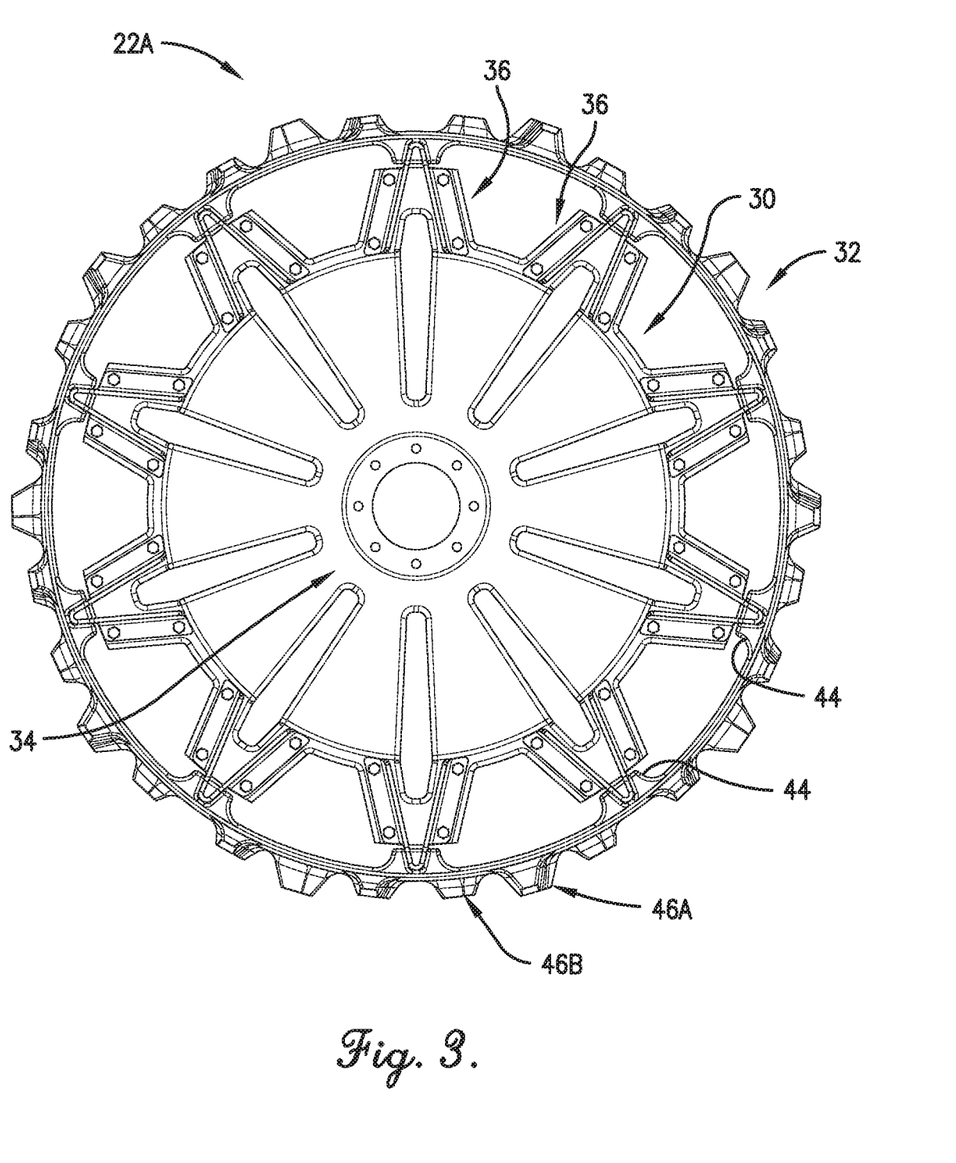
FIG. 3 is a side elevation view of the airless flexible tire of FIG. 2 mounted on a rigid wheel.
Figure 4:
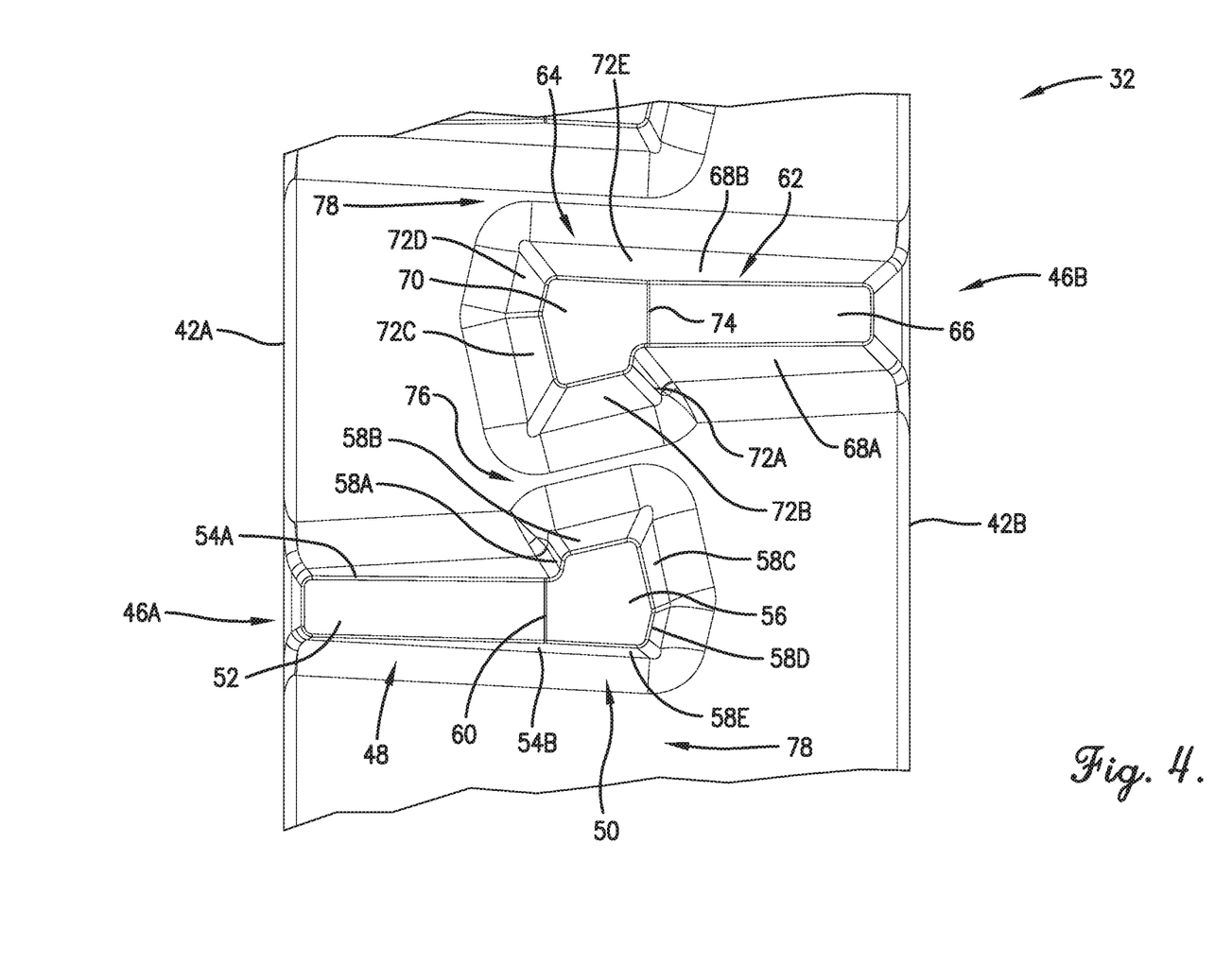
FIG. 4 is a partial front elevation view of the airless flexible tire of FIG. 2.

Referring now to FIGS. 2-4, a wheel assembly 22A constructed in accordance with embodiments of the invention is illustrated. The wheel assembly 22A broadly includes a rigid wheel 30 and an airless flexible tire 32 mounted thereon. The rigid wheel 30 is configured to be rotatably connected to the drive tube 26A via an axle and may include a central support 34 and a plurality of mounting components 36. The central support 34 may be a hub or similar component configured to be mounted or fastened to the axle. The mounting components 36 may be mounting bosses or other radially extending protrusions, fasteners, fastener openings, or separate components radially attached to the central support 34 via fasteners or interlocking geometry. In one embodiment, the rigid wheel 30 has a polygonal shape with the mounting components 36 being points of the polygon shape. The rigid wheel 30 may include between six and twenty mounting components 36. In one embodiment, the rigid wheel 30 includes ten mounting components 36.

The airless flexible tire 32 is configured to be mounted on the rigid wheel 30 and includes an inner surface 38, an outer surface 40, opposing sidewalls 42A,B, drive lugs 44, and pairs of traction lugs 46A,B. The inner surface 38 and outer surface 40 may be substantially transversely flat such that the airless flexible tire 32 exerts substantially downward ground engaging pressure and little to no lateral ground engaging pressure. The opposing sidewalls 42A,B extend between side edges of the inner surface 38 and outer surface 40.

The drive lugs 44 are spaced from each other on the inner surface 38 for aligning with and engaging the mounting components 36 of the rigid wheel 30. The drive lugs 44 may be separate mounting elements or may be integrally formed on the airless flexible tire 32 and may include complementary geometry for securing the airless flexible tire 32 on the rigid wheel 30.

The traction lug pairs 46A,B create a non-directional lug pattern and each include a forward facing traction lug 46A and a rearward facing traction lug 46B forming a divided Z or reverse divided Z shape. The traction lug pairs 46A,B are identical in every aspect except for their placement on the outer surface 40 of the airless flexible tire 32, so one of the traction lug pairs 46A,B is shown enlarged in FIG. 4 and will now be described in detail.

Traction lug 46A includes an elongated lateral section 48 extending generally transversely across the outer surface 40 of the airless flexible tire 32 from the sidewall 42A to the centerline of the airless flexible tire 32 and an enlarged central section 50 extending from an end of the lateral section 48. The lateral section 48 includes an upper surface 52 and opposing sidewalls 54A,B that connect the upper surface 52 to the airless flexible tire 32. The upper surface 52 may be slanted from an upper surface of the central section 50 to the sidewall 42A and angled such that the lateral section 48 tapers from the central section 50 to the sidewall 42A. This allows the traction lug 46A to exert more pressure on the ground near the centerline of the airless flexible tire 32 and less pressure on the ground near the sidewall 42A. Sidewall 54B of the lateral section 48 may coincide with an adjacent sidewall of the central section 50 or may be angled therefrom.

The central section 50 straddles the centerline of the airless flexible tire 32 and includes an upper surface 56 and a plurality of discrete sidewalls 58A-E that connect the upper surface 56 to the airless flexible tire 32. The upper surface 56 may be substantially flat or slightly convex and may protrude radially farther than the upper surface 52 of the lateral section 48 from the central axis of the airless flexible tire 32. To that end, the upper surface 56 may be connected to the upper surface 52 of the lateral section 48 at discrete edge 60. The discrete sidewalls 58A-E may be different sizes and angled relative to each other such that the central section 50 has an irregular polygon shape. The discrete sidewalls 58A-E are drafted for improved soil shedding.

Traction lug 46B is substantially identical to traction lug 46A except for its position and orientation on the outer surface 40 of the airless flexible tire 32. That is, traction lug 46B includes an elongated lateral section 62 extending generally transversely across the outer surface 40 of the airless flexible tire 32 from the sidewall 42B to the centerline of the airless flexible tire 32 and an enlarged central section 64 on the end of the lateral section 62. The lateral section 62 includes an upper surface 66 and opposing sidewalls 68A,B that connect the upper surface 52 to the airless flexible tire 32. The upper surface 66 may be slanted from an upper surface of the central section 64 to the sidewall 42B and angled such that the lateral section 62 tapers from the central section 64 to the sidewall 42B. This allows the traction lug 46B to exert more pressure on the ground near the centerline of the airless flexible tire 32 and less pressure on the ground near the sidewall 42B. Sidewall 68B of the lateral section 62 may coincide with an adjacent sidewall of the central section 64 or may be angled therefrom.

The central section 64 straddles the centerline of the airless flexible tire 32 and includes an upper surface 70 and a plurality of discrete sidewalls 72A-E that connect the upper surface 70 to the airless flexible tire 32. The upper surface 70 may be substantially flat or slightly convex and may protrude radially farther than the upper surface 66 of the lateral section 62 from the central axis of the airless flexible tire 32. To that end, the upper surface 70 may be connected to the upper surface 66 of the lateral section 62 at discrete edge 74. The discrete sidewalls 72A-E may be different sizes and angled relative to each other such that the central section 64 has an irregular polygon shape. The discrete sidewalls 72A-E are drafted for improved soil shedding.

The traction lugs 46A,B are paired so as to form a divided Z or reverse divided Z shape. To that end, the central section 50 of traction lug 46A may extend towards the central section 64 of traction lug 46B. The discrete sidewall 58B may be a primary sidewall extending parallel to a primary sidewall of traction lug 46B (e.g., discrete sidewall 72B) so as to form a space 76 of uniform width dividing portions of the Z or reverse Z shape. The parallel extending primary sidewalls may extend at an angle between 1 and 45 degrees from a transverse axis of the airless flexible tire 32.

The traction lug pair 46A,B is spaced from other traction lug pairs so as to form a pattern of divided Z or reverse divided Z shapes. To that end, discrete sidewalls 58E and 72E may be secondary sidewalls extending parallel to the secondary sidewall of the nearest traction lug of adjacent traction lug pairs so as to form spaces 78 of uniform width dividing traction lug pair 46A,B from the adjacent traction lug pairs.

In some embodiments, the traction lugs of the airless flexible tire 32 may have a torque reduction profile. That is, the traction lugs farther away from the drive lugs 44 may be taller than the traction lugs closer to the drive lugs 44. Traction lugs closer to the drive lugs 44 may also be slanted at an angle towards the nearest drive lug. The decrease in traction lug height near the drive lugs 44 decreases torque generated by the wheel assembly 22A since the traction lugs near the drive lugs 44 cannot move radially inward into recesses between mounting components 36 as much as traction lugs farther from the drive lugs 44. The traction lugs may also have central sections and lateral sections, the central sections being larger than the lateral sections and including prominent multi-faceted ends for providing lateral stability and resisting side slippage.

In use, the airless flexible tire 32 engages a layer of compliant soil as the rigid wheel 30 traverses a path along the ground surface with the traction lugs gripping soil along the path. The taller central sections 50 and 64 of the traction lugs 46A,B create higher pressure in the middle of the path, thus forming a high pressure center zone.

The primary sidewalls (e.g., discrete sidewalls 58B and 72B) urge soil into space 76 so as to form a ridge in the soil in the high pressure center zone. The ridge traps water running down the path, which decreases soil erosion. The secondary sidewalls (e.g., discrete sidewalls 58E and 72E) counteract lateral forces on the irrigation system 10 and prevent slippage. The discrete sidewalls 54A,B, 58A-E, 68A,B, and 72A-E having distinct angles therebetween, direct soil in specific directions, which improves ridge formation and soil shedding and minimizes outward soil disruption.

The above-described airless flexible tire 32 provides several advantages over conventional tires. For example, the divided Z shape or reverse divided Z shape of the traction lug pairs 46A,B and the distinct angles between the discrete sidewalls 54A,B, 58A-E, 68A,B, and 72A-E improve ridge formation and soil shedding. The primary sidewalls further improve ridge formation, which increases traction and decreases soil erosion. The secondary sidewalls and/or prominent ends of the traction lugs counteract lateral forces and prevent side slippage, which decreases the chances of the wheel assembly 22A becoming stuck in the path.

The taller central sections 50 and 64 of the traction lugs 46A,B increase central pressure in the path while the smaller and/or tapered lateral sections 48 and 62 help to minimize outward soil disruption. This decreases rut formation and further decreases the chances of the wheel assembly 22A becoming stuck in the path. The larger areas of the upper surfaces 56 and 70 of the central sections 50 and 64 add rigidity to the central portion of the airless flexible tire 32. The smaller and/or tapered lateral sections 48 and 62 help to minimize outward soil disruption. The drafted sidewalls 54A,B, 58A-E, 68A,B, and 72A-E shed soil and improve mold release during production. The traction lugs may also have a torque reduction profile, which can be used when less driving torque is desired.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An airless flexible wheel covering comprising:
   opposing inner and outer surfaces having side edges;
   opposing sidewalls extending from the side edges of the inner surface to the side edges of the outer surface;
   a plurality of mounting elements on the inner surface, the mounting elements being configured to engage mounting components of a rigid wheel; and
   a plurality of traction lugs on the outer surface, each traction lug having:
     a lateral section extending from one of the sidewalls of the airless flexible wheel covering towards a centerline of the airless flexible wheel covering, the lateral section having opposing sidewalls; and
     a central section extending from an end of the lateral section so as to straddle the centerline of the airless flexible wheel covering, the central section having a plurality of discrete sidewalls angled from each other, at least one of the discrete sidewalls being angled from an adjacent one of the opposing sidewalls of the lateral section,
   the traction lugs being paired such that each traction lug pair includes a forward facing traction lug and a rearward facing traction lug so that the traction lugs form a non-directional lug pattern, the central sections of paired traction lugs extending towards each other,
   a first set of the plurality of traction lugs being positioned circumferentially near the plurality of mounting elements,
   a second set of the plurality of traction lugs being positioned circumferentially between traction lugs of the first set of the plurality of traction lugs,
   the traction lugs of the second set of the plurality of traction lugs having a maximum height greater than a maximum height of the traction lugs of the first set of the plurality of traction lugs thereby forming a torque reduction profile.

2. The airless flexible wheel covering of claim 1, wherein at least one of the discrete sidewalls extends parallel to a discrete sidewall of the central section of the other traction lug in the pair so as to form a space of uniform width between the central sections of the paired traction lugs.

3. The airless flexible wheel covering of claim 2, wherein the parallel extending discrete sidewalls extend at an angle from a transverse axis of the airless flexible wheel covering.

4. The airless flexible wheel covering of claim 1, wherein at least one of the discrete sidewalls extends parallel to a discrete sidewall of a central section of a nearest traction lug of an adjacent traction lug pair so as to form a space of uniform width therebetween.

5. The airless flexible wheel covering of claim 1, wherein the traction lugs are taller near the centerline and shorter near the sidewalls of the airless flexible wheel covering.

6. The airless flexible wheel covering of claim 1, wherein the lateral sections taper in width from the central sections to the sidewalls of the airless flexible wheel covering.

7. The airless flexible wheel covering of claim 1, wherein the sidewalls of the traction lugs are drafted for soil shedding.

8. The airless flexible wheel covering of claim 1, wherein each pair of traction lugs forms a divided Z or reverse divided Z shape.

9. The airless flexible wheel covering of claim 1, wherein the central sections of the traction lugs are substantially flat.

10. The airless flexible wheel covering of claim 1, wherein the central sections of the traction lugs are larger than the lateral sections and include prominent multi-faceted ends for providing lateral stability and resisting side slippage.

11. The airless flexible wheel covering of claim 1, wherein the traction lugs of the second set of the plurality of traction lugs alternate between forward facing traction lugs and rearward facing traction lugs.

12. A wheel assembly for traversing a path along a ground surface having a layer of son, the wheel assembly comprising:
a central support having a plurality of mounting components; and
an airless flexible wheel covering mounted on the mounting components of the central support, the airless flexible wheel covering comprising:
opposing inner and outer surfaces having side edges;
opposing sidewalls extending from the side edges of the inner surface to the side edges of the outer surface;
a plurality of mounting elements on the inner surface, the mounting elements being configured to engage the mounting components of the central support; and
a plurality of traction lugs on the outer surface, each traction lug having:
a lateral section extending from one of the sidewalls of the airless flexible wheel covering towards a centerline of the airless flexible wheel covering, the lateral section having opposing sidewalls; and
a central section extending from an end of the lateral section so as to straddle the centerline of the airless flexible wheel covering, the central section having a plurality of discrete sidewalls angled from each other, at least one of the discrete sidewalls being angled from an adjacent one of the opposing sidewalls of the lateral section,
the traction lugs being paired such that each traction lug pair includes a forward facing traction lug and a rearward facing traction lug so that the traction lugs form a non-directional lug pattern, the central sections of paired traction lugs extending towards each other,
a first set of the plurality of traction lugs being positioned circumferentially near the plurality of mounting elements,
a second set of the plurality of traction lugs being positioned circumferentially between traction lugs of the first set of the plurality of traction lugs,
the traction lugs of the second set of the plurality of traction lugs having a maximum height greater than a maximum height of the traction lugs of the first set of the plurality of traction lugs thereby forming a torque reduction profile.

13. The wheel assembly of claim 12, wherein at least one of the discrete sidewalls extends parallel to a discrete sidewall of the central section of the other traction lug in the pair so as to form a space of uniform width between the central sections of the paired traction lugs.

14. The wheel assembly of claim 13, wherein the parallel extending discrete sidewalls extend at an angle from a transverse axis of the airless flexible wheel covering.

15. The wheel assembly of claim 12, wherein at least one of the discrete sidewalls extends parallel to a discrete sidewall of a central section of a nearest traction lug of an adjacent traction lug pair so as to form a space of uniform width therebetween.

16. The wheel assembly of claim 15, wherein the parallel extending discrete sidewalls of the central sections of adjacent traction lugs of adjacent traction lug pairs extend parallel to a transverse axis of the airless flexible wheel covering.

17. The wheel assembly of claim 12, wherein the traction lugs are taller near the centerline and shorter near the sidewalls of the airless flexible wheel covering.

18. The wheel assembly of claim 12, wherein the lateral sections taper in width from the central sections to the sidewalls of the airless flexible wheel covering.

19. The wheel assembly of claim 12, wherein the sidewalls of the traction lugs are drafted for soil shedding.

20. The wheel assembly of claim 12, wherein each pair of traction lugs forms a divided Z or reverse divided Z shape.

21. The wheel assembly of claim 12, wherein the traction lugs of the second set of the plurality of traction lugs alternate between forward facing traction lugs and rearward facing traction lugs.

22. A wheel assembly for traversing a path along a ground surface having a layer of son, the wheel assembly comprising:
a central support having a plurality of mounting components; and
an airless flexible wheel covering mounted on the central support, the airless flexible wheel covering comprising:
opposing inner and outer surfaces having side edges;
opposing sidewalls extending from the side edges of the inner surface to the side edges of the outer surface;
a plurality of mounting elements on the inner surface, the mounting elements being configured to engage the mounting components of the central support; and
a plurality of traction lugs on the outer surface, each traction lug having:
a lateral section extending from one of the sidewalls of the airless flexible wheel covering towards a centerline of the airless flexible wheel covering, the lateral section having opposing sidewalls; and
a central section extending from an end of the lateral section so as to straddle the centerline of the airless flexible wheel covering, the central section having a plurality of discrete sidewalls angled from each other, at least one of the discrete sidewalls being angled from an adjacent one of the opposing sidewalls of the lateral section,
the traction lugs being paired such that each traction lug pair includes a forward facing traction lug and a rearward facing traction lug so that the traction lugs form a non-directional lug pattern of divided Z or reverse divided Z shapes, the central sections of paired traction lugs extending towards each other, at least one of the discrete sidewalls of each traction lug extending parallel to a discrete sidewall of the other traction lug in the pair so as to form a space of uniform width between paired traction lugs, the parallel extending discrete sidewalls extending at an angle from a transverse axis of the airless flexible wheel covering, the traction lugs being taller near the centerline and shorter near the sidewalls of the airless flexible wheel covering, a first set of the plurality of traction lugs being positioned circumferentially near the plurality of mounting elements, a second set of the plurality of traction lugs being positioned circumferentially between traction lugs of the first set of the plurality of traction lugs, the traction lugs of the second set of the plurality of traction lugs having a maximum height greater than a maximum height of the traction lugs of the first set of the plurality of traction lugs thereby forming a torque reduction profile.

23. The wheel assembly of claim 22, wherein the traction lugs of the second set of the plurality of traction lugs alternate between forward facing traction lugs and rearward facing traction lugs.

\* \* \* \* \*